United States Patent [19]
Shedd et al.

[11] Patent Number: 5,847,387
[45] Date of Patent: Dec. 8, 1998

[54] SUPPORT DEVICE AND STAGE ASSEMBLY FOR A SCANNED-PROBE MICROSCOPE

[75] Inventors: Gordon M. Shedd, Honeoye Falls; Kevin J. Owens, Pittsford, both of N.Y.

[73] Assignee: Burleigh Instruments, Inc., Fishers, N.Y.

[21] Appl. No.: 711,194

[22] Filed: Sep. 10, 1996

[51] Int. Cl.⁶ .................................................. H01J 37/00
[52] U.S. Cl. ................................... 250/306; 250/440.11
[58] Field of Search ........................... 250/440.11, 306; 359/391, 392

[56] References Cited

U.S. PATENT DOCUMENTS

| | | | |
|---|---|---|---|
| 4,837,445 | 6/1989 | Nishioka et al. | 359/392 |
| 4,935,634 | 6/1990 | Hansma et al. | 250/306 |
| 5,083,022 | 1/1992 | Miyamoto et al. | 250/306 |
| 5,198,715 | 3/1993 | Elings et al. . | |
| 5,260,572 | 11/1993 | Marshall . | |
| 5,286,977 | 2/1994 | Yokoyama et al. | 250/306 |
| 5,296,704 | 3/1994 | Mishima et al. | 250/306 |
| 5,306,919 | 4/1994 | Elings et al. . | |
| 5,388,452 | 2/1995 | Harp et al. . | |
| 5,483,064 | 1/1996 | Frey et al. . | |

*Primary Examiner*—Bruce Anderson
*Attorney, Agent, or Firm*—Jaeckle Fleischmann & Mugel, LLP

[57] ABSTRACT

A support device for a scanned-probe microscope comprises a horizontal base member and a vertical bridge member that are transverse to one another. The horizontal and vertical members are connected at their respective opposite ends by a common chord member extending between the ends. The device preferably includes means for attaching a scanned-probe microscope to a forward surface of the vertical bridge member. The support device preferably further includes one or more bracket members, each attached at one end to the rearward surface of the vertical bridge member and at the opposite end to a rearward surface of the chord member. Each bracket includes a section extending away from the chord member. The horizontal base member and the chord member each has an upper surface substantially coplanar with one another. The substantially coplanar upper surfaces together provide support for a readily separable sample plate. Further in accordance with the invention, a microscope stage assembly comprises the described support device and a readily separable sample plate.

40 Claims, 3 Drawing Sheets

SUPPORT DEVICE AND STAGE ASSEMBLY FOR A SCANNED-PROBE MICROSCOPE

FIELD OF THE INVENTION

The present invention has to do with microscopy and more particularly, to a support device and a stage assembly for a scanned-probe microscope.

BACKGROUND OF THE INVENTION

Traditional optical microscopes that use lenses to focus visible light radiation are limited by the diffraction of the radiation to resolve details no smaller than about 200–250 nanometers. However, atomic scale details of samples can be resolved by a class of microscopes generally referred to as scanned-probe microscopes. One such type of instrument, a scanned tunneling microscope, utilizes an electrical potential across the gap between the probe tip and the sample to form a measurable tunneling current of tip and sample surface electrons. Another type of microscope, known as an atomic force or a scanning force microscope, makes use of force arising between probe and sample atoms that causes measurable deflection of a cantilever bearing the probe tip. Examples of atomic force and scanning probe microscopes are shown in one or more of the following U.S. Patents which are incorporated by reference: 5,306,919; 5,260,572; 5,388,452; 5,483,064, and 5,198,715.

Regardless of the particular type of microscope employed, examination of atomic scale features of a sample requires a highly spatially stable environment, free of extraneous uncontrolled movement that could unpredictably affect the instrument and/or sample. To prevent such adverse conditions, a microscope is typically bolted or otherwise permanently attached to a heavy sample plate that may be, for example, a granite block. This arrangement can cause substantial difficulties should the need arise to move the instrument and attached sample plate. The weight of the plate makes its transport unwieldy, in the course of which damage to the delicate, relatively light microscope may occur. A convenient means for connecting the microscope and sample plate for operation under spatially stable conditions that allows the plate to be readily removed without the use of tools, thereby facilitating relocation of the apparatus when the need arises, would be desirable. The support device and stage assembly of the present invention provide this benefit.

SUMMARY OF THE INVENTION

A support device for a scanned-probe microscope comprises a horizontal base member and a vertical bridge member that are transverse to one another. The horizontal and vertical members are connected at their respective opposite ends by a common chord member extending between the ends. The device preferably includes means for attaching a scanned-probe microscope to a forward surface of the vertical bridge member.

The support device preferably further includes one or more bracket members, each attached at one end to the rearward surface of the vertical bridge member and at the opposite end to a rearward surface of the chord member. Each bracket includes a section extending away from the chord member.

The horizontal base member and the chord member each has an upper surface substantially coplanar with one another. The substantially coplanar upper surfaces together provide support for a readily separable sample plate.

Further in accordance with the invention, a microscope stage assembly comprises the described support device and a readily separable sample plate.

DETAILED DESCRIPTION OF THE EMBODIMENTS

Figure 1:
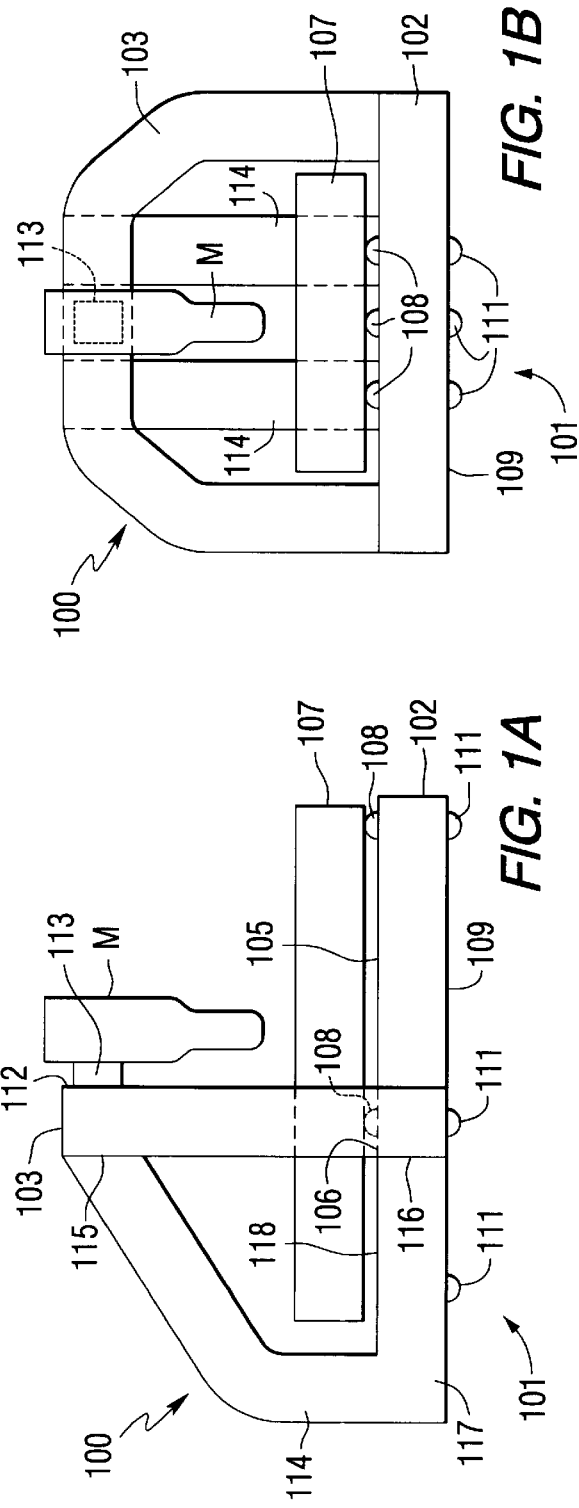
FIGS. 1A, 1B and 1C are plan views, from the side, front, and top, respectively, of one embodiment of the microscope support device and stage assembly of the present invention.

Referring to FIGS. 1A, 1B and 1C, microscope stage assembly 100 includes a support device 101 having a horizontal base member 102 and a vertical bridge member 103 that are transverse to one another and connected at their respective opposite ends by a common chord member 104. In the embodiment depicted in FIGS. 1A, 1B, and 1C, both horizontal member 102 and vertical member 103 have arcuate shapes. Horizontal arcuate member 102 and chord member 104 each has an upper surface, 105 and 106, respectively, that are substantially coplanar with one another and together provide support for separable sample plate 107. Upper surfaces 105 and 106 are optionally provided with sample plate contact points 108. Members 102 and 104 each have lower surfaces, 109 and 110, respectively, that are substantially coplanar with one another. Lower surfaces 109 and 110 are optionally provided with base support points 111, which are preferably located directly beneath corresponding sample plate contact points 108.

Forward surface 112 of vertical arcuate member 103 is, in a preferred embodiment, provided with means such as mounting plate 113 for attaching a microscope M to support device 101. Mounting plate 113 is preferably disposed at substantially the midpoint of vertical member 103.

In a further preferred embodiment of device 101, two bracket members 114 are each attached to rearward surfaces 115 and 116, respectively, of vertical member 103 and chord member 104. Bracket members 114 each includes a section 117 that extends away from rearward surface 115 of chord member 104 and has an upper surface 118 that is substantially coplanar with surfaces 105 and 106 and may optionally include a sample plate contact point 108. Sample plate 107, which is readily separable from support device 101, rests on sample plate contact points 108.

Figure 2:
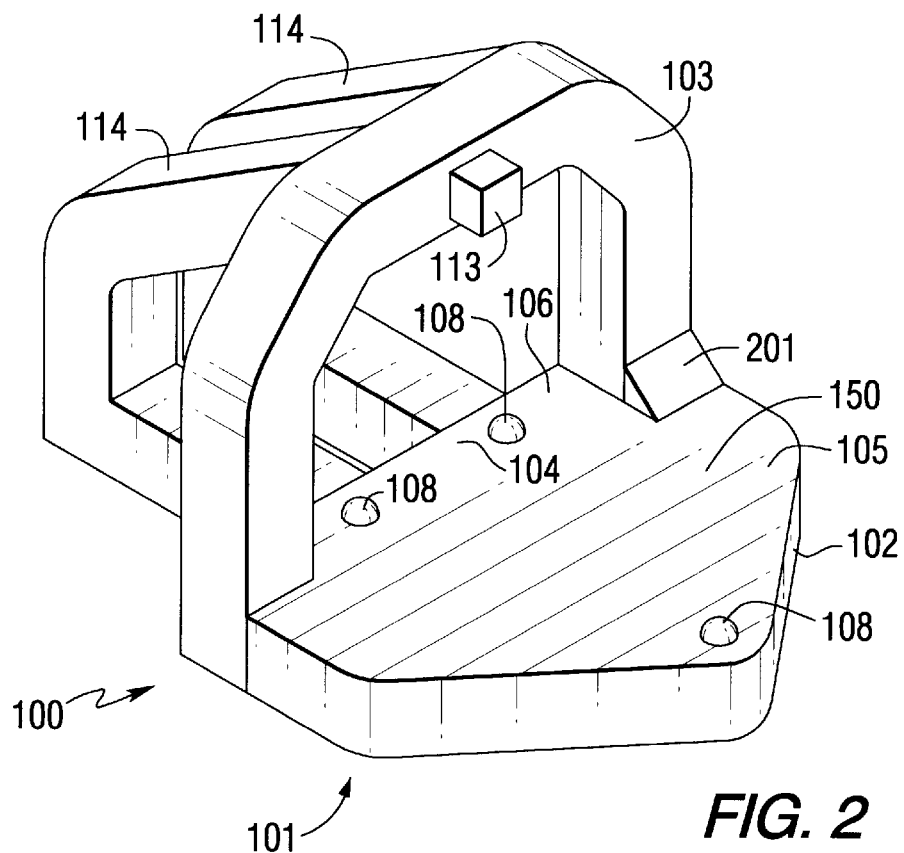
FIG. 2 is a perspective view of an embodiment of the support device of the invention.

FIG. 2 is a perspective view of support device 101 that does not include microscope M and sample plate 107. Shown in FIG. 2 is an optional rigidizing member 201 connecting horizontal base member 102 and vertical bridge member 103, both depicted as having optionally arcuate shapes. The horizontal base member 102 may also comprise a solid member as indicated by the dash lines 150 as shown in FIG. 2. In that case, the chord member 104 is integral with the solid base member 150.

The rigid construction of support device 101 and the weight of sample plate 107 minimize the interfering effects of mechanical vibrations on the generally lower frequency resonances provided by piezoelectric or electrostrictive materials used in scanned-probe microscope actuators. Support device 101 is preferably constructed of a metal alloy with a low coefficient of thermal expansion, and sample plate 107 is preferably a granite slab.

Figure 3:
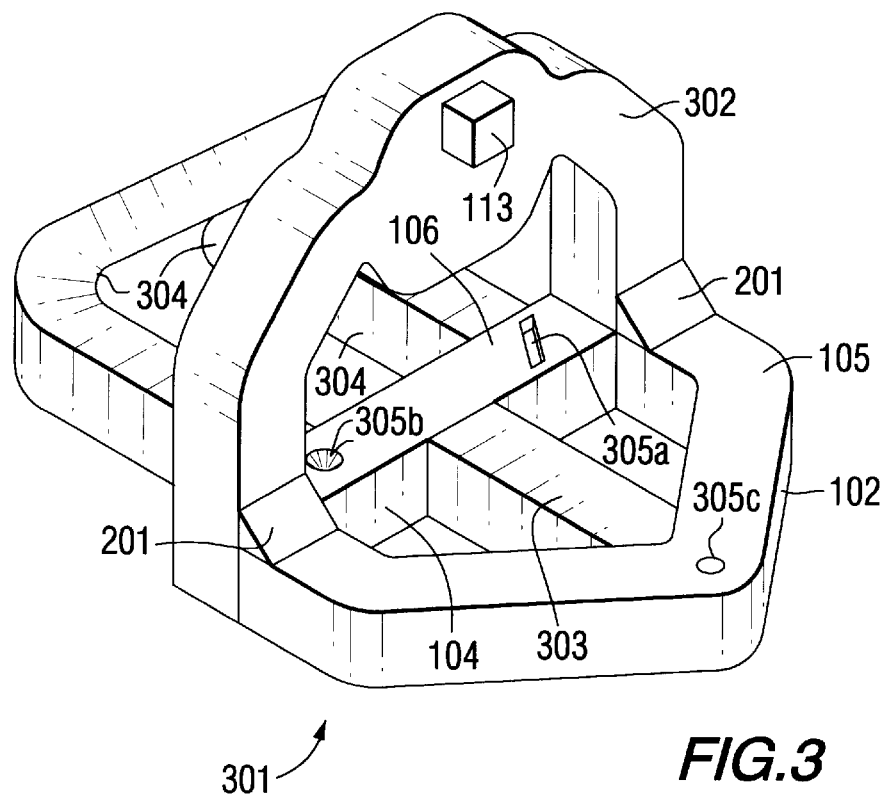
FIG. 3 is a perspective view of a preferred embodiment of the support device of the invention.
Figure 3B:
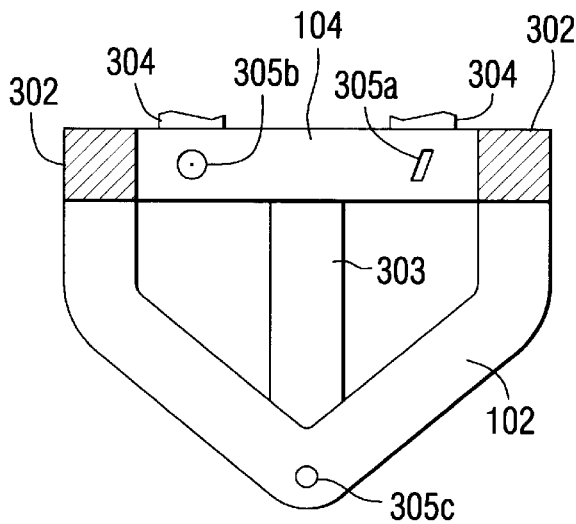
FIGS. 3B and 3C are plan views from the top and front, respectively, illustrating the sample plate contacts for a kinematic mount included in the base of the support device depicted in FIG. 3.
Figure 3A:
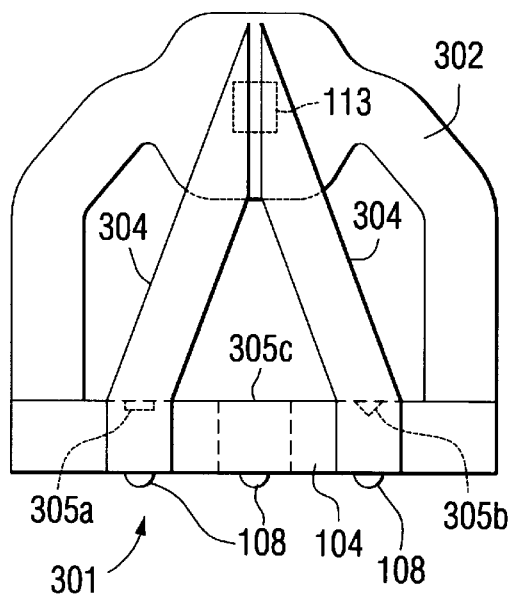
FIG. 3A is a plan view from the rear of the embodiment depicted in FIG. 3.

FIG. 3 is a perspective view of a preferred embodiment 301 of the support device of the invention. Embodiment 301 differs from embodiment 101 (FIG. 2) in the broadening of the upper portion of vertical arcuate member 302 bearing microscope mounting plate 113, the addition of horizontal rigidizing member 303 connecting chord member 104 and horizontal arcuate member 102 at their respective midpoints, and the inclination of bracket members 304 towards one another. This disposition of bracket members 304 is clearly illustrated in the rearward plan view of device 301 in FIG. 3A.

Figure 3C:
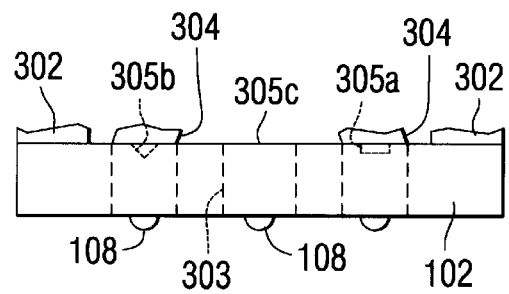

Sample plate contact points 305a, 305b, and 305c of device 301, together with correspondingly positioned base contact points on the lower surface of sample plate 107 (FIGS. 1A–C) provide a kinematic mount that dampens the effect of external mechanical vibrations and thereby enhances the reliability of sample surface measurements by the piezoelectric or electrostrictive actuator of a scanned-probe microscope. In the depicted embodiment, contact point 305a is a depression in upper surface 106 of chord member 104, preferably a slot at an angle of 45 degrees to the length dimension of chord member 104. Contact point 305b is also a depression in surface 106, preferably conical in shape. Contact point 305c is disposed on the planar upper surface 105 of horizontal arcuate member 102. This configuration of sample plate contact points 305a–c is more clearly illustrated in FIGS. 3B and 3C.

The aforementioned kinematic mount includes contact points 305a–c together with three corresponding base contact points, each preferably a hemispherically shaped nub on the lower surface of sample plate 107. Alternatively, the kinematic mount may be formed in a reverse configuration, with slot- and conical-shaped depressions and a flat point on the lower surface of sample plate 107 corresponding to three substantially hemispherically shaped sample plate contact points 108, as shown in FIGS. 1A–C.

Thus, the microscope stage assembly of the present invention provides a stable environment for accurate and reproducible microscopic observations and measurements. At the same time, the easy separability, without the need for tools, of the heavy sample plate from the support device and attached microscope facilitates relocation of the apparatus as the need arises.

The present invention has been described in detail for the purpose of illustration, but it is understood that such detail is solely for that purpose, and variations can be made therein by those skilled in the art without departing from the spirit and scope of the invention, which is defined by the following claims.

What is claimed is:

1. A support device for a scanned-probe microscope comprising:
   a horizontal base member and a vertical bridge member, each said member terminating in opposite ends, said horizontal and vertical members being disposed transversely to one another and connected at their respective opposite ends to a common chord member extending between said opposite ends;
   probe means supported by said vertical member;
   wherein said horizontal base member and said chord member each has an upper surface substantially coplanar with one another, said coplanar upper surfaces together providing support for a readily separable sample plate.

2. The support device of claim 1 further comprising:
   means for attaching a scanned-probe microscope to a forward surface of said vertical bridge member.

3. The support device of claim 3 wherein said means for attaching a scanned-probe microscope is disposed at substantially the midpoint of said vertical bridge member.

4. The support device of claim 1 wherein either or both of said horizontal base and vertical bridge members have an arcuate shape.

5. The support device of claim 1 further comprising:
   one or more bracket members, each attached at one end to a rearward surface of the vertical bridge member and at the opposite end to a rearward surface of the chord member, each said bracket member including a section extending away from said chord member.

6. The support device of claim 5 comprising two vertically bracket members, spaced apart from and substantially parallel to one another.

7. The support device of claim 5 comprising two bracket members inclined towards one another, their said ends attached to said vertical bridge member being more closely spaced from one another than their said opposite ends attached to said chord member.

8. The support device of claim 5 wherein each said bracket member has an arcuate shape.

9. The support device of claim 5 wherein the section of each said bracket member extending away from said chord member has an upper surface substantially coplanar with the upper surfaces of said horizontal base member and said chord member.

10. The support device of claim 9 further comprising:
    a plurality of sample plate contact points disposed on said substantially coplanar upper surfaces.

11. The support device of claim 10 wherein said horizontal base member, said chord member, and said section of each bracket member extending away from said chord member each has a lower surface substantially coplanar with one another.

12. The support device of claim 11 further comprising:
    a plurality of base support points disposed on said substantially coplanar lower surfaces.

13. The support device of claim 12 wherein said base support points on said substantially coplanar lower surfaces are situated directly beneath corresponding sample plate contact points on said substantially coplanar upper surfaces.

14. The support device of claim 5 further comprising:
    rigidizing means connecting said horizontal base and vertical bridge members.

15. The support device of claim 5 further comprising:
    a horizontal rigidizing member connecting said chord and horizontal base members at substantially their respective midpoints.

16. A microscope stage assembly for a scanned-probe microscope, said stage assembly comprising:
    a support device comprising a horizontal base member and a vertical bridge member, each said member terminating in opposite ends, said horizontal and vertical members being disposed transversely to one another and connected at their respective opposite ends to a common chord member extending between said opposite ends;
    probe means supported by said vertical member;
    wherein said horizontal base member and said chord member each has an upper surface substantially coplanar with one another, said substantially coplanar upper surfaces together providing support for a readily separable sample plate; and a readily separable sample plate disposed on said substantially coplanar upper surfaces.

17. The microscope stage assembly of claim 16 further comprising:

means for attaching a scanned-probe microscope to a forward surface of the vertical bridge member.

18. The microscope stage assembly of claim 17 wherein said means for attaching a scanned-probe microscope is disposed at substantially the midpoint of said vertical bridge member.

19. The microscope stage assembly of claim 16 wherein either or both of said horizontal base and vertical bridge members have an arcuate shape.

20. The microscope stage assembly of claim 16 further comprising:

one or more bracket members, each attached at one end to a rearward surface of the vertical bridge member and at the opposite end to a rearward surface of the chord member, each said bracket member including a section extending away from said chord member.

21. The microscope stage assembly of claim 20 comprising two vertically disposed bracket members, spaced apart from and substantially parallel to one another.

22. The microscope stage assembly of claim 20 comprising two bracket members inclined towards one another, their said ends attached to said vertical bridge member being more closely spaced one from another than their said opposite ends attached to said chord member.

23. The microscope stage assembly of claim 20 wherein each said bracket member has an arcuate shape.

24. The microscope stage assembly of claim 20 wherein the section of each said bracket member extending away from said chord member has an upper surface substantially coplanar with the upper surfaces of said horizontal base member and said chord member.

25. The microscope stage assembly of claim 20 further comprising:

rigidizing means connecting said horizontal base and vertical bridge members.

26. The microscope stage assembly of claim 16 further comprising:

a plurality of sample plate contact points disposed on said substantially coplanar upper surfaces.

27. The microscope stage assembly of claim 26 wherein said horizontal base member, said chord member, and said section of each bracket member extending away from said chord member each has a lower surface substantially coplanar with one another.

28. The microscope stage assembly of claim 27 further comprising:

a plurality of base support points disposed on said substantially coplanar lower surfaces.

29. The microscope stage assembly of claim 28 wherein said base support points on said substantially coplanar lower surfaces are situated directly beneath corresponding sample plate points on said substantially coplanar upper surfaces.

30. The microscope stage assembly of claim 26 wherein said plurality of sample contact points on said substantially coplanar upper surfaces and a plurality of corresponding base contact points on a substantially planar lower surface of said sample plate together comprise a kinematic mount.

31. The microscope stage assembly of claim 30 wherein at least one of said sample plate contact points comprises a depression in said substantially coplanar upper surfaces.

32. The microscope stage assembly of claim 30 wherein at least one of said base contact points comprises a depression in said substantially planar lower surface of said sample plate.

33. The microscope stage assembly of claim 30 wherein at least one of said sample plate contact points comprises a substantially hemispherically-shaped nub on said substantially coplanar upper surfaces.

34. The microscope stage assembly of claim 30 wherein at least one of said base contact points comprises a substantially hemispherically-shaped nub on said substantially planar lower surface of said sample plate.

35. A scanned-probe microscope assembly comprising:

a scanned-probe microscope including probe means;

a support device comprising a horizontal base member and a vertical bridge member, each said member terminating in opposite ends, said horizontal and vertical members being disposed transversely to one another and connected at their respective opposite ends to a common chord member extending between said opposite ends, said microscope coupled to said vertical member;

wherein said horizontal base member and said chord member each has an upper surface substantially coplanar with one another, said coplanar upper surfaces together providing support for a readily separable sample plate; and a readily separable sample plate disposed on said substantially coplanar upper surfaces.

36. The scanned-probe microscope assembly of claim 35 further comprising:

one or more bracket members, each attached at one end to a rearward surface of the vertical bridge member and at the opposite end to a rearward surface of the chord member, each said bracket member including a section extending away from said chord member.

37. The scanned-probe microscope assembly of claim 35 further comprising:

a plurality of sample plate contact points disposed on said substantially coplanar upper surfaces; and a plurality of corresponding base contact points disposed on a substantially planar lower surface of said sample;

wherein said sample plate contact points and said corresponding base contact points together comprise a kinematic mount.

38. A support device for a scanned-probe microscope comprising:

a scanned-probe microscope with a probe means;

a horizontal base member and a vertical bridge member, each said member terminating in opposite ends, said horizontal and vertical members being disposed transversely to one another and connected at their respective opposite ends by a chord member, said chord member integral with said horizontal member;

the scanned-probe microscope coupled to said vertical member;

wherein said horizontal base member has an upper surface, said upper surface providing support for a readily separable sample plate.

39. A microscope and stage assembly for a scanned-probe microscope comprising:

a support device comprising a horizontal base member and a vertical bridge member, each said member terminating in opposite ends, said horizontal and vertical members being disposed transversely to one another and connection at their respective opposite ends by a chord member, said chord member integral with said horizontal member;

a scanned-probe microscope with a probe means coupled to said vertical member;

wherein said horizontal base member has an upper surface, said upper surface providing support for a readily separable sample plate; and a readily separable sample plate disposed on said upper surface.

40. A scanned-probe microscope assembly comprising:

a scanned-probe microscope with probe means;

a support device comprising a horizontal base member and a vertical bridge member, each said member terminating in opposite ends, said horizontal and vertical members being disposed transversely to one another and connected at their respective opposite ends by a chord member, said chord member integral with said horizontal member;

said scanned-probe microscope coupled to said vertical member;

wherein said horizontal base member has an upper surface, said upper surface providing support for a readily separable sample plate; and a readily separable sample plate disposed on said upper surface.

* * * * *